Figure 4:
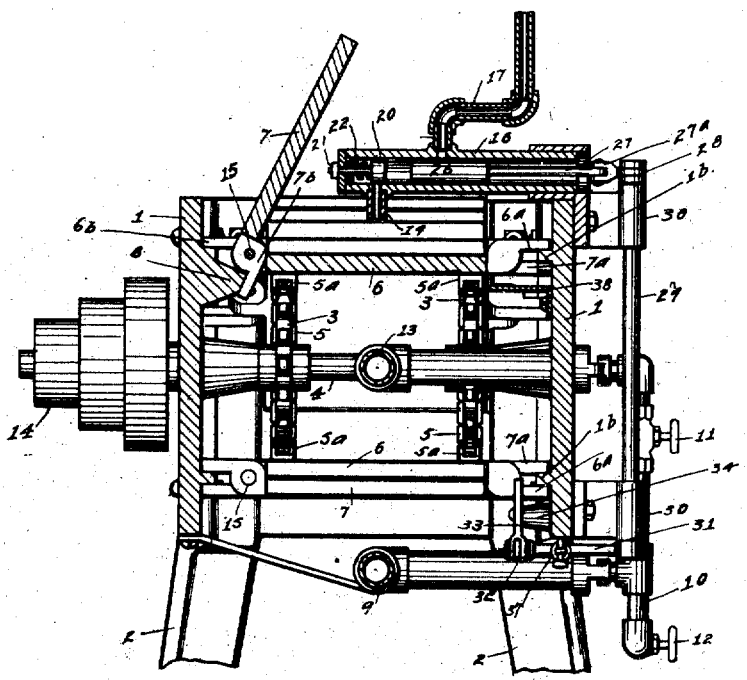

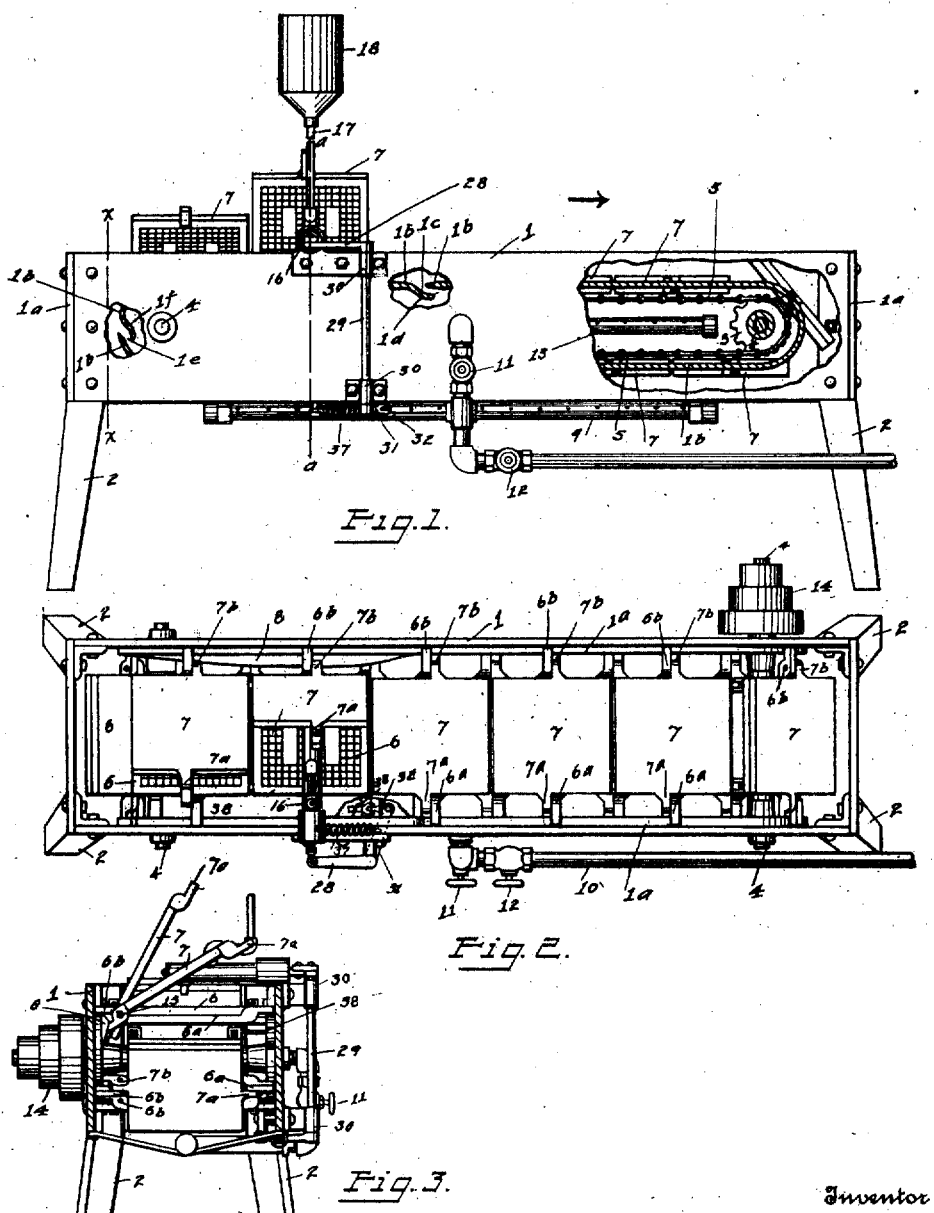

G. E. MAYLE, C. R. MURDOCK & W. D. BELKNAP.
BAKING APPARATUS.
APPLICATION FILED MAY 9, 1910.

990,577.

Patented Apr. 25, 1911.
2 SHEETS—SHEET 2.

UNITED STATES PATENT OFFICE.

GEORGE E. MAYLE, CHARLES R. MURDOCK, AND WILLIAM D. BELKNAP, OF COLUMBUS, OHIO.

BAKING APPARATUS.

990,577.  Specification of Letters Patent.  Patented Apr. 25, 1911.

Application filed May 9, 1910.  Serial No. 560,301.

*To all whom it may concern:*

Be it known that we, GEORGE E. MAYLE, CHARLES R. MURDOCK, and WILLIAM D. BELKNAP, citizens of the United States, residing at Columbus, in the county of Franklin and State of Ohio, have invented certain new and useful Improvements in Baking Apparatus, of which the following is a specification.

Our invention relates to the improvement of baking apparatus and the objects of our invention are to provide an improved apparatus for the production of baked products, in which improved means are provided for carrying a plurality of baking plates over a continuous path during the baking operation and in which improved means are provided for raising and lowering the upper baking plates or griddle sections at predetermined intervals.

A further object of our invention consists in providing improved means for automatically discharging a predetermined amount of batter on to the lower baking plates at proper intervals.

These objects we accomplish in the manner illustrated in the accompanying drawings, in which—

Figure 1 is a side elevation of our improved baking apparatus, portions of the outer wall thereof being broken away for the sake of clearness in illustration. Fig. 2 is a plan view. Fig. 3 is a sectional view on line $x-x$ of Fig. 1, and Fig. 4 is an enlarged transverse section on line $a-a$ of Fig. 1.

Similar numerals refer to similar parts throughout the several views.

In carrying out our invention, we employ a horizontally disposed frame comprising parallel side pieces 1 and connecting end pieces $1^a$, the frame thus formed having suitable supporting legs 2. Journaled transversely in each end of the frame is a shaft 4, each of these shafts carrying a pair of separated sprocket wheels 3. The sprocket wheels in one end of the frame are connected with the corresponding sprocket wheels in the other end, by endless chain belts 5. To these chains are clamped or otherwise secured the projecting brackets $5^a$ of baking plates 6, these plates being arranged at regular intervals upon the chains. Each of these baking plates, has one of its ends which we will term the forward end, provided with an upwardly and thence outwardly projecting angular lug or extension $6^a$, while at the rear or opposite end of the plate, is formed an upwardly and outwardly extending lug or extension $6^b$.

7 represent the outer baking plates, which at their outer ends are provided with downwardly projecting and thence outwardly extending lugs $7^a$. At its opposite end, each of the plates 7 is formed with a downwardly and thence outwardly projecting lug $7^b$, which lug is pivoted or hinged as indicated at 15 to the corresponding lug $6^b$ of the inner plate 6. The inner surface of each of the side frame members 1 has formed therewith an inwardly projecting track projection which is indicated at $1^b$ and which comprises parallel upper and lower horizontal members having curved end connections. One of the tracks $1^b$ has its upper horizontal member at a point near the center of its length, broken or separated as indicated at $1^c$, the end portion of one of the broken sections being bent downward below the end portion of the adjacent section as indicated at $1^d$. In a similar manner this track is also broken or separated at one end as shown at $1^e$ and the terminal portion of one of the broken sections, is bent on the inner side of the terminal portion of the remaining section as indicated at $1^f$.

When the baking plates of each pair are in their lowered or closed positions, the outwardly extending portions of the lugs $6^a$ and $7^a$ embrace opposite sides of the track $1^b$. The upper portion of the inner surface of the rear side frame member 1, has formed on one side of the center of its length an inwardly extending cam projection 8 which tapers toward the inner surface of the side frame toward each end.

Beneath the lower line of baking plates, is suitably supported lengthwise of the machine a tubular gas burner 9 which leads from a gas supply pipe 10 which is provided with suitable gas controlling valves 11 and 12. Between the lines of baking plates is also supported a tubular gas burner 13 which also leads from the pipe 10. One of the shafts 4 has mounted on an outward extension thereof, suitable driving pulleys 14 to which motion may be imparted through a belt leading from a power wheel.

Before describing the construction of other features of our invention, we will proceed to explain the operation of those portions of the apparatus which have been heretofore described.

Rotary motion being imparted to one of the shafts 4, it is obvious that through the connection of the sprocket wheels 3 and the connection of the chains 5 with the baking plate sections 6, a continuous traveling or carrying motion will be imparted to the baking plates and during this operation, it is obvious that both the inner and upper plate sections will be heated from the burners 13 and 9, thereby baking or cooking the batter which has previously been applied to the outer surfaces of the inner baking plates in the manner hereinafter described. It is obvious that the engagement of the plate lugs 6ª and 7ª with opposite sides of one of the track members 1ᵇ, will serve to hold the plates of each pair in desirable closed positions, but assuming that the plates are traveling in the direction indicated by the arrow in Fig. 1 of the drawing, it will be understood that as the lugs 7ª of the plates 7 move outward through the opening 1ᶜ of the track, the locking action of the track will be discontinued inasmuch as both of said lugs will be transferred to the outer side of the track, thereby permitting the raising of the upper or outer baking plate from the lower plate for the purpose of removing the baked product and supplying new batter to the inner plate. In order to automatically effect this raising of the outer plate to the position indicated in the drawing, we have provided the elongated cam projection 8 which by contact with the lug 7ᵇ as indicated more clearly in Fig. 4 of the drawing, operates to raise the upper or outer baking plate to the desired open position and as said lug moves off the end of the cam projection, it will be understood that the baking plate will drop to its closed position by gravity. When the forward lugs of each pair of plates arrive at the break or opening 1ᶜ of the track 1ᵇ, it is obvious that the plate lug 7ª will pass downward through the opening 1ᶜ and again engage the underside of the track, while the lug 7ᵇ will engage the under side of the track, thus again locking the plate sections together.

When the upper plate section is raised in the manner described, the baked product is removed from the lower section and before the upper plate is again closed downward in the manner described, the desired amount of batter is deposited on the lower plate. While it is obvious that this batter might be applied by hand, we have provided means for automatically discharging the batter on to the plate which we will proceed to describe.

Supported at the proper point above the machine is a horizontal cylinder 16 which has leading into its upper side near the center of its length a supply pipe 17 which leads from a batter containing reservoir 18. Above the plates, the cylinder is provided with a downwardly extending discharge nozzle 19. Within the inner end portion of the cylinder is provided a plunger or sliding valve 20 the stem 21 of which extends through the inner end of the cylinder. Between the cylinder end and the valve body 20, the valve stem 21 is surrounded by a coiled spring 22 which normally presses the valve outward to a position over the cylinder opening to the nozzle 19. We also provide in the cylinder 16 a piston or plunger 26 which has an outwardly extending stem or rod 27 the outer end of said rod or stem being pivotally connected at 27ª with one end of a horizontally disposed lever 28, the remaining end of which is connected with one end of a vertical shaft or operating rod 29 which is journaled in bearing brackets 30 which project from the side of the machine.

The lower end of a rod or shaft 29 carries an inwardly extending lever 31 the extremity of which is connected through a link 32 with a normally upright lever 33, said lever being pivoted at the center of its height to a boss 34 which projects from the inner side of the adjacent frame member 1. The lever 33 is normally retained in an upright or substantially upright position through the medium of a spring 37, one end of which is connected with the frame of the machine and the remaining end to the lever 31. It will be observed that the lever 31 is thus normally retained in the path of the plate lugs 6ª and as each of these lugs comes into contact with the lever 33, the said lever is pressed downward until the lug has passed out of contact therewith, this movement of the lever resulting through its connections with the rod or shaft 29 and the connections of the latter with the piston rod 27, in pulling the piston 26 outward in the cylinder 16 to admit a charge of batter into the cylinder from the pipe 17. When the lever 33 assumes its normal position through tension of the spring 37, it is obvious that the piston 26 will again be moved inward, forcing the batter against the valve body 20 and pressing the latter back against the spring 22 until the nozzle 19 is opened and the batter permitted to escape downward through said nozzle on to the plate 6. As soon as the batter is thus discharged, it is obvious that both the piston 26 and the valve 20 are free to return to their normal positions, the valve 20 moving to the position shown in Fig. 4 of the drawing, in which position it covers the opening to the nozzle 19 and the piston 26 moving outward beyond the opening to the pipe 17 and permitting a discharge of batter therefrom to the cylinder 16.

From the construction described, it will be observed that mechanism is provided whereby batter to be baked into cake form, is automatically discharged at intervals on to a series of sectional baking plates and that means are provided for automatically closing and locking the baking plate sections together, cooking the batter between the plates, releasing the plate sections and lifting the upper section thereof.

From the foregoing description, it will be seen that simple and efficient means are herein provided for accomplishing the objects of the invention, but while the elements shown and described are well adapted to serve the purposes for which they are intended, it is to be understood that the invention is not limited to the precise construction set forth, but includes within its purview such changes as may be made within the scope of the appended claims.

What we claim, is—

1. In a baking apparatus, the combination of a framework, a flexible endless carrier mounted to travel within said frame, tracks on the framework having broken-away portions, baking plates connected with said carrier at intervals and having lugs engaging opposite sides of the tracks, said plates being adapted to open at one of the broken-away portions of the track and close at another of said broken-away portions, means for imparting motion to the carrier, and means for subjecting the baking plates to heat during their traveling movement.

2. In a baking apparatus, the combination with a frame, a flexible endless carrier mounted to travel therein, of pairs of baking plates having lugs adapted to engage with the track-way, said track-way having broken-away portions therein to cause the plates to open and close.

In testimony whereof we affix our signatures in presence of two witnesses.

GEORGE E. MAYLE.
CHARLES R. MURDOCK.
WILLIAM D. BELKNAP.

Witnesses:
C. C. SHEPHERD,
A. L. PHELPS.